(12) United States Patent
Prescott

(10) Patent No.: US 9,909,850 B2
(45) Date of Patent: Mar. 6, 2018

(54) DEVICE FOR SIMULTANEOUSLY MEASURING HEADBOX SLICE OPENING AND SETBACK IN A PAPERMAKING MACHINE

(71) Applicant: Paperchine, Inc., Rockton, IL (US)

(72) Inventor: Ralph Prescott, Roscoe, IL (US)

(73) Assignee: Paperchine, Inc., Rockton, IL (US)

( * ) Notice: Subject to any disclaimer, the term of this patent is extended or adjusted under 35 U.S.C. 154(b) by 140 days.

(21) Appl. No.: 15/098,711

(22) Filed: Apr. 14, 2016

(65) Prior Publication Data

US 2016/0305070 A1 Oct. 20, 2016

Related U.S. Application Data

(60) Provisional application No. 62/147,155, filed on Apr. 14, 2015.

(51) Int. Cl.
*G01B 5/14* (2006.01)
*D21F 1/02* (2006.01)

(52) U.S. Cl.
CPC .............. *G01B 5/14* (2013.01); *D21F 1/028* (2013.01)

(58) Field of Classification Search
CPC ........................................................ G01B 5/14
USPC ....... 33/484, 485, 494, 567, 568, 679.1, 701
See application file for complete search history.

(56) References Cited

U.S. PATENT DOCUMENTS

| | | | |
|---|---|---|---|
| 1,356,987 A * | 10/1920 | Ingle | G01B 3/02 33/494 |
| 3,575,799 A | 4/1971 | Gedemer et al. | |
| 3,813,285 A | 5/1974 | Shelor | |
| 3,914,156 A | 10/1975 | Batcher | |
| 3,947,317 A | 3/1976 | Stotz et al. | |
| 3,994,773 A | 11/1976 | Wolf et al. | |
| 4,342,619 A * | 8/1982 | Gladh | D21F 1/028 162/259 |
| 4,517,055 A | 5/1985 | Dove | |
| 4,539,073 A | 9/1985 | Andersson | |
| 4,851,083 A | 7/1989 | Metzler | |
| 5,271,807 A | 12/1993 | Kinzler | |
| 7,335,280 B2 * | 2/2008 | Lampi | G01B 11/306 162/198 |
| 2003/0208918 A1* | 11/2003 | Burke | G09B 19/02 33/484 |

(Continued)

*Primary Examiner* — G. Bradley Bennett
(74) *Attorney, Agent, or Firm* — Volpe and Koenig, P.C.

(57) ABSTRACT

A measuring device and method for simultaneously measuring both a slice lip opening and a setback of a headbox slice in a headbox of a papermaking machine are provided. The measuring device is formed by a block having a stop depending from the bottom at the back of the block that is adapted to be placed against the apron lip tip. A height measurement scale is located on a side surface and extends in a direction from the front to the back adapted for measuring the slice opening b. A setback distance measurement scale is located at the top extending from a zero position aligned in a fixed relation with the stop surface toward a front of the block for measuring the setback L. A movable sliding indicator connected to the block slides includes a slice lip locator adapted to move into sliding contact with the slice lip to indicate the setback distance L on the setback distance measuring scale while simultaneously indicating the slice opening b on the height measurement scale.

15 Claims, 7 Drawing Sheets

(56) References Cited

U.S. PATENT DOCUMENTS

| | | | |
|---|---|---|---|
| 2004/0176770 A1* | 9/2004 | Knopfle | A61B 17/86 33/562 |
| 2015/0168120 A1* | 6/2015 | Cupertino | G01B 3/30 33/194 |
| 2016/0178338 A1* | 6/2016 | Webb | G01B 3/1084 33/701 |

* cited by examiner

DEVICE FOR SIMULTANEOUSLY MEASURING HEADBOX SLICE OPENING AND SETBACK IN A PAPERMAKING MACHINE

FIELD OF THE INVENTION

The present invention concerns a device for measuring both slice lip opening and setback in a headbox of a papermaking machine. It is particularly concerned with such a device which allows for direct measurement of both slice opening and setback simultaneously as the slice lip is positioned using a single instrument which does not require opening the headbox or moving the breast roll to gain access.

BACKGROUND OF THE INVENTION

In the manufacture of paper products in either a single or twin fabric forming section of a papermaking machine, a highly fluid stock is delivered as a precisely controlled jet from a headbox 1 through a slice opening 2 onto a moving forming fabric as it passes around a breast roll and over a forming board or shoe (see FIG. 1). The headbox 1 and slice 2 are key parts of the papermaking process as together they will determine, to a great extent, the uniformity and formation properties of the finished sheet.

FIG. 2 illustrates the known arrangement in more detail. The headbox slice 2 controls the volume of stock and the angle of impingement of the stock jet 8 delivered onto the forming fabric 9 which is supported by the breast roll 11. It is important to maintain the headbox slice 2 opening at a constant cross-sectional area so as to produce a uniform paper web. The angle of impingement is controlled by the position of the slice lip 3 of the headbox slice 2 in relation to the apron 5, or bottom lip; this position is referred to as the setback L. As the slice lip 3 can be moved both up and down as well rotationally, its movement either upstream or downstream relative to the apron 5 will change the point of impingement resulting in a noticeable impact on sheet formation. The angle of impingement of the stock jet, and thus the position of the point of impingement on the forming fabric, is determined by the ratio L/b, where L is the setback, or relative location of the slice lip 3 with respect to the edge or tip 6 of the apron 5, and b is the height of the slice lip opening above the apron 5 (see FIG. 2).

The position of the tip 4 of the slice lip 3 relative to the position of the tip 6 of the lower apron 5 is critical for locating the point of impingement of the stock jet and to regulate the volume of stock flow from the headbox. When the ratio $L/b \approx 0.5$, then the angle of impingement of the stock jet is relatively steep, creating a situation referred to as "pressure forming"; when the ratio $L/b \geq 1$, then the angle of impingement is comparatively flatter and the jet travels relatively parallel to the fabric for a longer distance, creating a configuration referred to as "velocity forming". Each configuration creates differing effects on the formation of the web, and both are commonly used for various purposes. Accurate measurement and control of both the slice lip opening b and setback L are thus extremely important with respect to the properties and quality of the paper product produced by the papermaking machine. Papermakers and service technicians must periodically verify both of these factors to ensure that neither has drifted from the "home position" over time, as well as make adjustments to the position of the slice lip 3 if it has moved. However, because of the proximity of the slice to the breast roll, it is often difficult to directly measure both of these critical parameters.

In the past, tapered blocks and/or "sliding parallels" have been used to measure the opening b but consistent measurement of the slice lip setback L required opening the headbox doors and/or lowering the breast roll to obtain access, and using a separate tool. It will be appreciated that either or both of these tasks is laborious and time consuming. What is needed then is a simple tool which will allow for simultaneous and accurate measurement of both the slice opening b and the setback L without necessitating either opening the headbox or moving the breast roll. The present invention provides a device which provides for such measurement without requiring specialized access or movement of any components adjacent the headbox.

PRIOR ART

Devices for measuring headbox slice and setback are known. Metzler U.S. Pat. No. 4,851,083 discloses a measurement tool for measuring three independent dimensions of a headbox slice, however the device does not allow for the slice lip to be tilted at some angle (see FIG. 3). Andersson U.S. Pat. No. 4,539,073 discloses a method and apparatus for measuring the size of a discharge slot in a headbox using ultrasonic transducers. Stotz U.S. Pat. No. 3,947,317 discloses an apparatus for adjusting and indicating the position of a breast box lip using an indicator including a curved line representative of slice lip motion. Gedemer U.S. Pat. No. 3,575,799 discloses an apparatus for adjusting a headbox slice opening which includes a dial gauge micrometer. Additional prior art includes Wolf et al. U.S. Pat. No. 3,994,773, Shelor U.S. Pat. No. 3,813,285, Dove U.S. Pat. No. 4,517,055, Kinzler U.S. Pat. No. 5,271,807 and Batcher U.S. Pat. No. 3,914,156, none of which disclose the novel features of the invention.

SUMMARY OF THE INVENTION

A measuring device and method for simultaneously measuring both slice lip opening and setback of the headbox slice in a headbox of a papermaking machine is provided. The headbox slice includes an upper lip having an upper lip tip, and a generally planar and horizontal lower apron lip including an outer apron lip tip. The upper lip is setback a distance L from the apron lip tip, and provides a slice opening b which is the distance from upper lip tip to the surface of the lower apron. The device comprises:

a) A block having an opposing top and bottom, an opposing front and back, and two side surfaces, the top being set at an angle relative to the bottom to provide the block with a varying vertical thickness from the top to the bottom that tapers down in a direction from the back to the front;

b) A stop depending from the bottom surface at the back of the block that is adapted to be placed with a stop surface against the apron lip tip;

c) A height measurement scale is located on at least one of the two side surfaces and extends in a direction from the front to the back and is adapted for measuring the slice opening b;

d) A setback distance measurement scale located at a top of the block extending from a zero position aligned with the stop surface toward a front of the block adapted for measuring the setback L; and e) A movable sliding indicator connected to the block that slides in a direction from front to back, the movable sliding indicator includes a slice lip locator adapted to move into sliding contact with the slice lip to indicate a setback distance L on the setback distance measuring scale while simultaneously indicating the slice opening b on the height measurement scale.

As available space for measurement tools is limited on modern papermaking equipment, the present measuring device enables the efficient measurement of the critical variables, which can be in various configurations, in a confined space.

The method of use includes inserting the front of the measuring device with the bottom against the slice apron such that the top is inclined relative to the slice apron so that the increasing thickness from front to back allows for measurement of the slice lip opening b. Once inserted so that the stop surface is in contact with the apron lip, the slice lip is lowered to contact the top of the measuring device. The movable sliding indicator is then slid against the slice lip. The measuring device is then removed, and the actual slice opening dimension b can be read by the position of the movable sliding indicator against the height measurement scale and the setback distance L can be read by the position of the movable sliding indicator against the setback distance measurement scale.

The measurement scales are preferably implemented as graduated scales located directly on or affixed to the block. Alternatively, the measurement scales can be encoded strips located directly on or affixed to the block that are, for example, encoded magnetically or via physical markings, that are read optically or magnetically by a reader on the sliding indicator in order to provide a digital reading that can be displayed on an electronic display, such an LCD display. Other types of measuring implements could also be adapted for use, which for the purposes of the present disclosure are included within the recitation of a "measurement scale."

The side surfaces preferably include grooves that are parallel to the top and extend from the front to the back, and the sliding indicator is preferably generally U-shaped with inwardly directed tabs at the ends of the U that engage and are slidable in the grooves.

The block may be provided as an upper block part and a lower block part that are connected together along an angled path relative to the bottom. By sliding the upper and lower block parts relative to one another, this arrangement allows for the nominal height to be adjusted and enables the measurement of a larger range of slice openings.

DETAILED DESCRIPTION OF THE PREFERRED EMBODIMENTS

Figure 1:
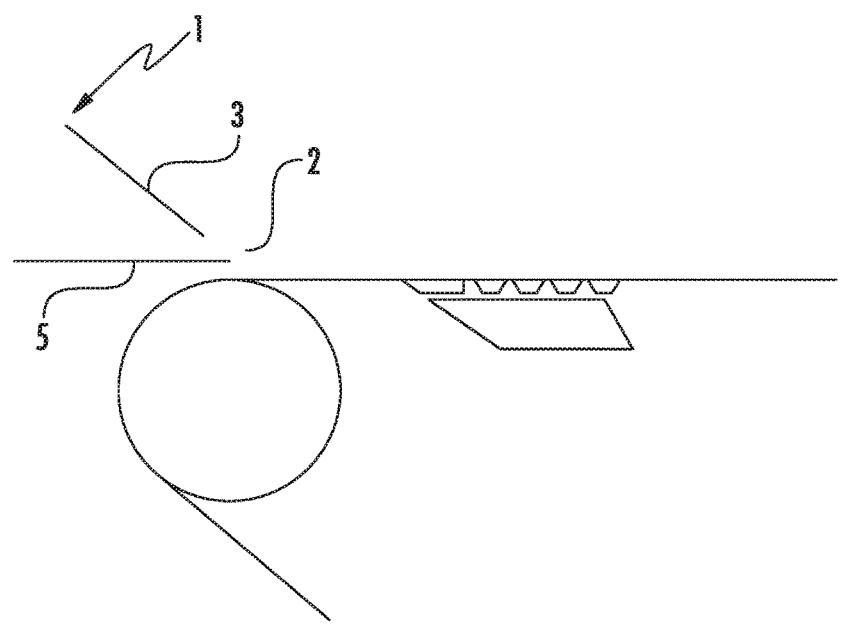
FIG. 1 is a simplified illustration showing in cross-section a single fabric forming section including headbox slice, breast roll, forming fabric and forming board according to the known prior art.
Figure 2:
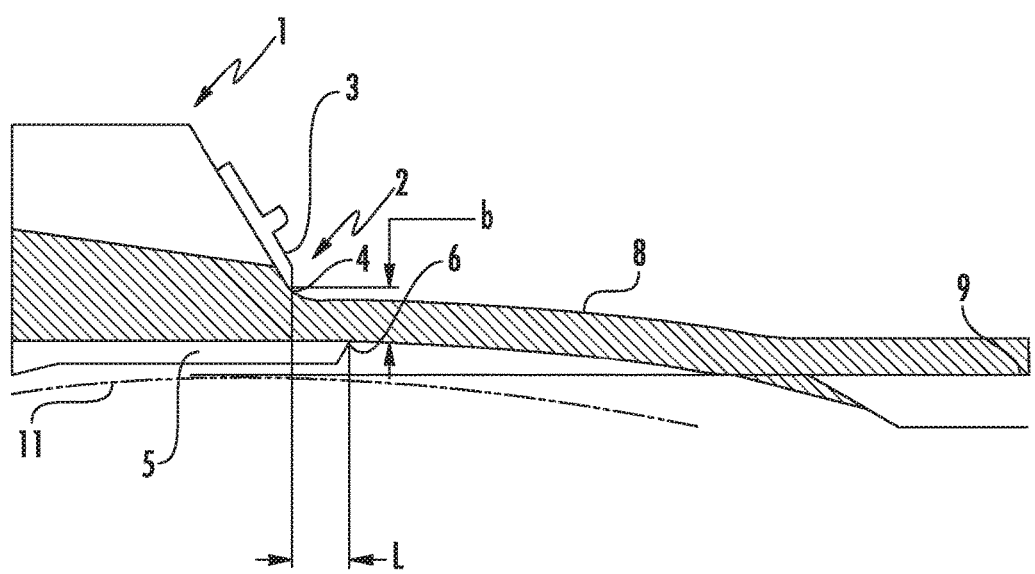
FIG. 2 is a simplified cross-sectional illustration of a headbox and slice showing the setback L and slice opening b according to the known prior art.
Figure 3:
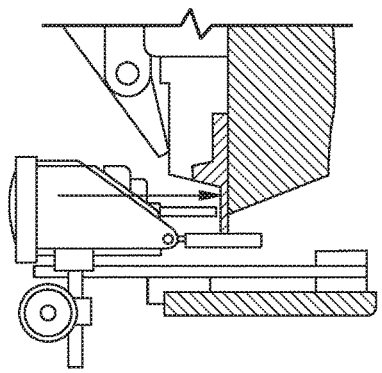
FIG. 3 is an illustration from U.S. Pat. No. 4,851,083 to Metzler which is prior art.

The invention concerns a measuring device 10, shown in FIGS. 4-10, for simultaneously measuring both slice opening b and the setback L of the tip of the upper slice lip 3 of a headbox 1 in relation to the lower apron lip tip 6 of the generally planar lower apron 3. The device 10 provides the papermaker with a tool to measure and precisely control both the location of the point of impingement of the stock jet and the stock flow from the headbox slice 2.

The measuring device 10 is formed of a block 12, which is preferably rectangular or polygonal, and is made of a robust and durable material, such as ultrahigh molecular weight (UHMW) polyethylene or other suitable material. The block 12 is shaped to include a top 14 and a bottom 16, an opposing front 18 and back 20, as well as two lateral side surfaces 22, 24. In use, the front 18 and back 20 respectively face towards and away from the headbox 1. The top 14, when in use, is oriented towards the upper slice lip tip 4; and the bottom 16, when in use, faces and is in contact with the lower apron 5. The top 14 is set at an angle relative to the bottom 16 to provide the block 12 with a varying vertical thickness from the top 14 to the bottom 16 that tapers down in a direction from the back 20 to the front 18. A stop 26, which can be in the form of an integral ledge, depends from the bottom 16 surface at the back 20 of the block 12 and is adapted to be placed with a stop surface 28 thereof against the apron lip tip 6.

At least one side surface 22, 24 and the top 14 are each provided with a measurement scale 30, 32 with precisely graduated demarcation markings or otherwise for distance measurement. The height measurement scale 30 is located on one or both of the side surfaces 22, 24 at or in proximity to the top 14. The height measurement scale 30 can be in a different measurement unit on each of the lateral sides 22, 24. For example, one lateral side 22 can have measurements in inches, and the other lateral side 24 can have measurements in millimeters. The setback distance measurement scale 32 on a top 14 of the block 12 extends from a zero position aligned in a fixed relation with the stop surface 28 toward a front 18 of the block 12 adapted for measuring the setback L.

The measurement scales 30, 32 are preferably implemented as graduated scales located directly on or affixed to the block 12. Alternatively, the measurement scales 30, 32 can be encoded strips located directly on or affixed to the block 12 that are, for example, encoded magnetically or via physical markings, that are read optically or magnetically by a reader, which can be mounted on a sliding indicator, such as 40 described below, in order to provide a digital reading that can be displayed on an electronic display, such an LCD display. Other types of measuring implements could also be adapted for use and are included within the recitation of a "measurement scale."

Figure 10:
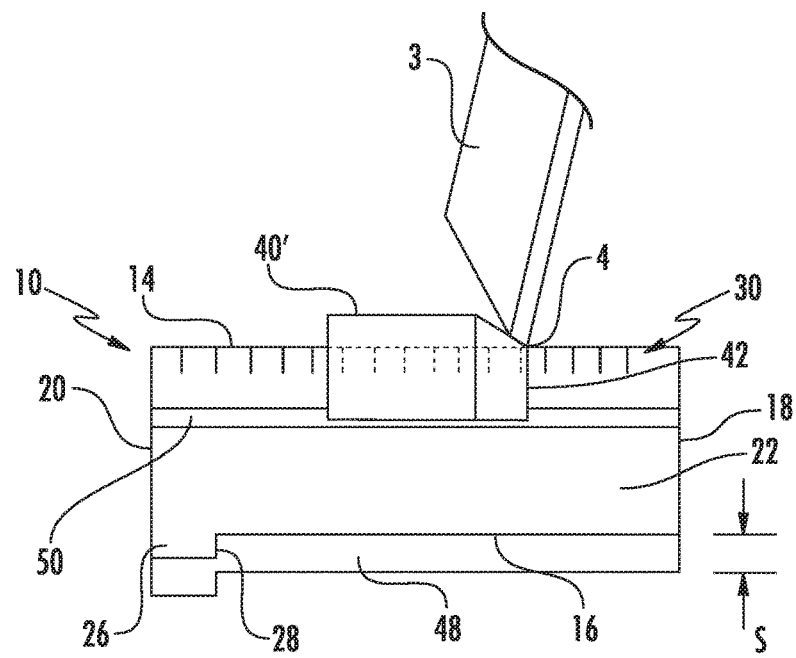
FIG. 10 is an enlarged illustration similar to FIG. 8 of an alternate configuration of the sliding indicator of the measuring device in contact with a slice lip as well as a detachable spacer for changing a height of the measuring device for different nominal slice opening dimensions.
Figure 11A:
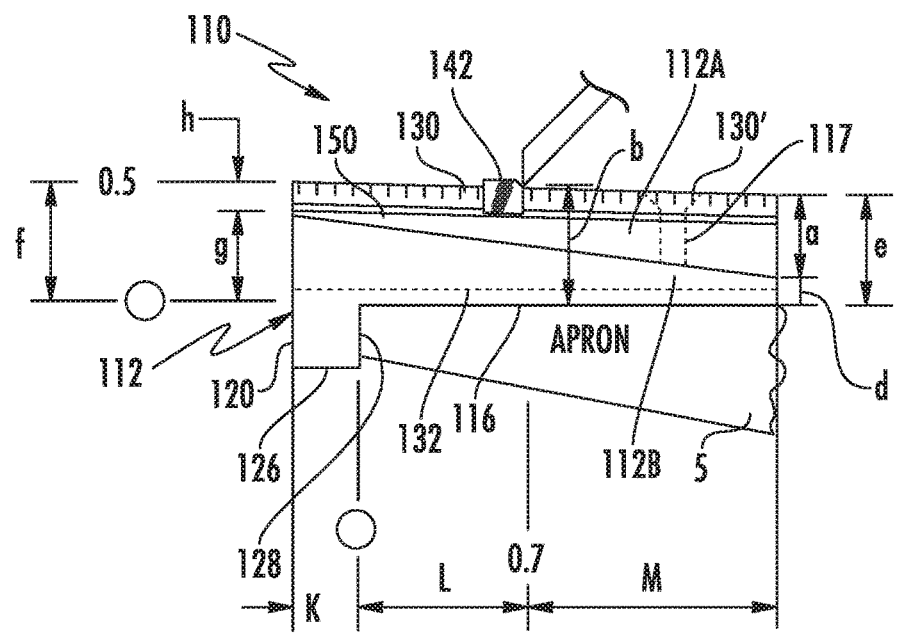
FIGS. 11A-11C are side, top, and front views of an alternate embodiment of the measuring device for measuring a slice lip.
Figure 11B:
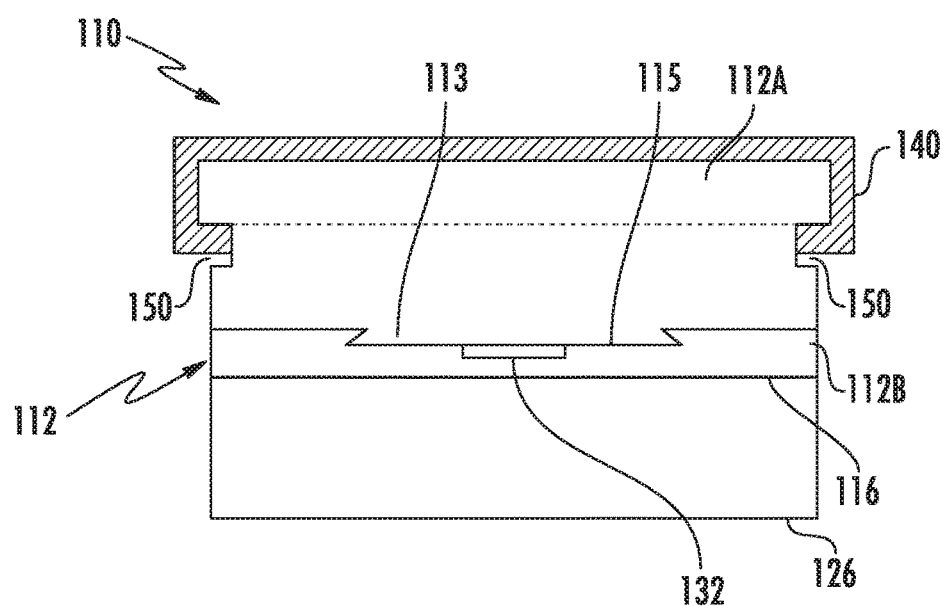
Figure 11C:
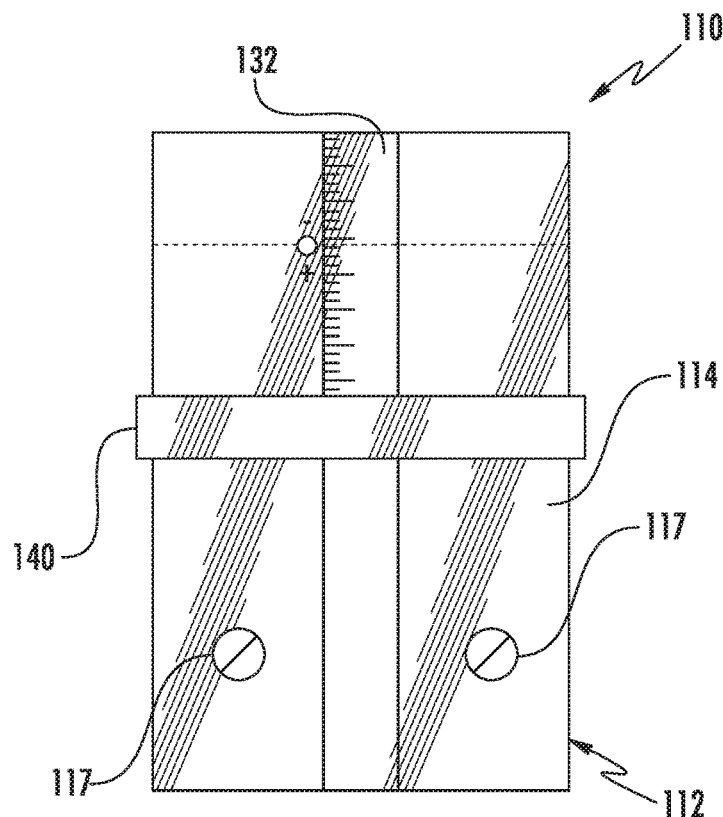

The block 12 is precisely dimensioned and shaped so as to be capable of insertion into a headbox slice opening and make contact with both the slice lip tip 6 and apron 5 and thereby allow measurement of the opening b and setback L. In a preferred embodiment, the is approx. 2" wide×3" long and between 0.5" to 1.125" thick. The thickness needs to be set at a nominal slice opening b for various different machines, which can be, for example, 0.5", 0.625", 0.75", 0.875", 1.0" and 1.125" so as to accommodate various headbox slice opening. In view of this, it is contemplated in accordance with the invention to either:

a) provide multiple (e.g. 4-6) such blocks, each of differing nominal vertical heights (from lower to upper surface), so as to accommodate the range of headbox slice openings presently in use (which range from about ⅜ inch up to about 3 inches), b) to use differing sized spacers, such as spacer block 48 in FIG. 10, or wedges to elevate and/or incline the upper surface to allow a single device to accommodate the range of slice lip openings currently in use, c) to "step" the bottom 16 of the device to provide multiple stops 26 and thicknesses for use depending on the size of the slice opening, or d) to provide a height adjustable block 112 as shown in FIGS. 11A-11C and 12, and described in detail below.

If separate spacer blocks 48 or wedges are used, they are placed beneath the bottom 16 of the block 12 so as to raise it a sufficient distance towards the upper slice lip tip to enable contact. The lower surface of the spacer block 28 includes a ledge or stop that is aligned with the stop surface 28, which extends beyond the plane of the lower surface so that, when in use, this stop can be located on the tip 6 of the apron 5 and thus provide the same fixed reference point for the measurements. The spacer blocks 48 can include connectors on the upper surface that engage the bottom 16 of the block 12, for example with a snap-in or LEGO™ type connector. Various thicknesses S of the spacer blocks 48 can be provided and marked with the appropriate thickness.

To provide an accurate height measurement, the top 14 is sloped with respect to the bottom 16 at a known gradient so the scale etched or otherwise located in the lateral side(s) 22, 24 indicates the "b" height. For example, for increased vertical measurement accuracy that can be easily visually determined to 0.001 inches or greater, the height measurement scale 30 may include gradations spaced 0.1 inches apart, each representing a change in height of 0.001 inches. This results in a slope angle for the block 12 with 10 graduations of 0.001 inches over 1 inch of:

arctan 0.01 inch/1 inch, or 0.573 degrees.

Figure 4:
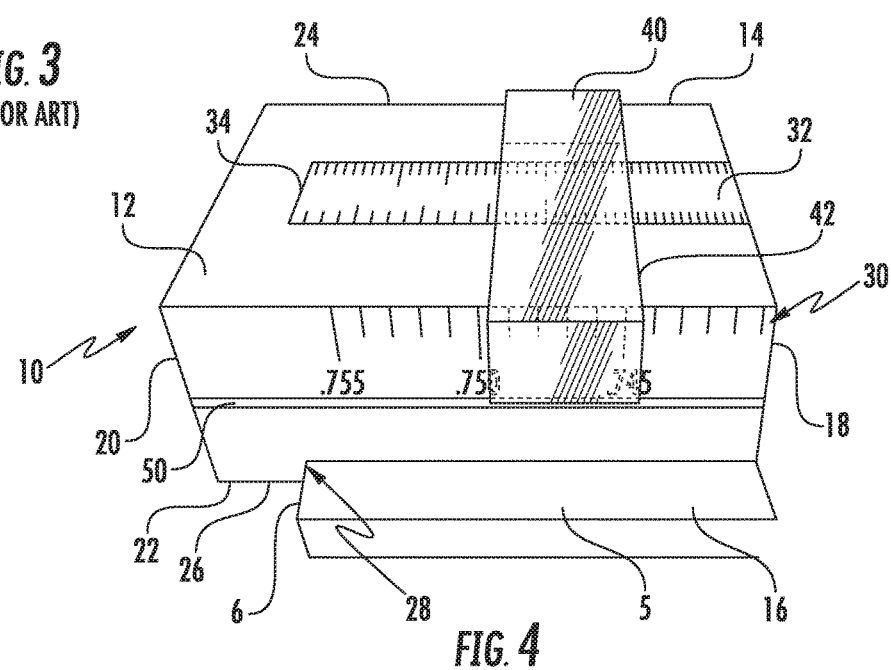
FIG. 4 is a view providing a perspective view of a measuring device according to the invention including a sliding indicator.
Figure 5:
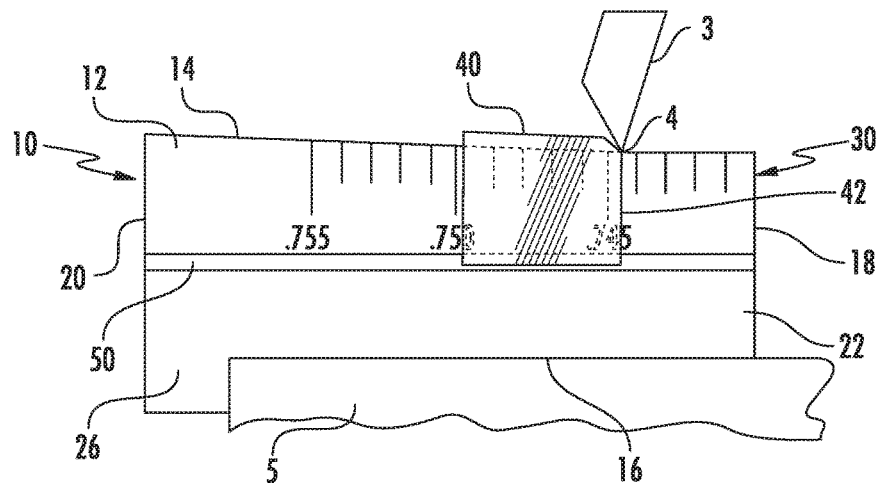
FIG. 5 is a view showing a side view of the height measurement scale of the measuring device shown in FIG. 4.
Figure 6:
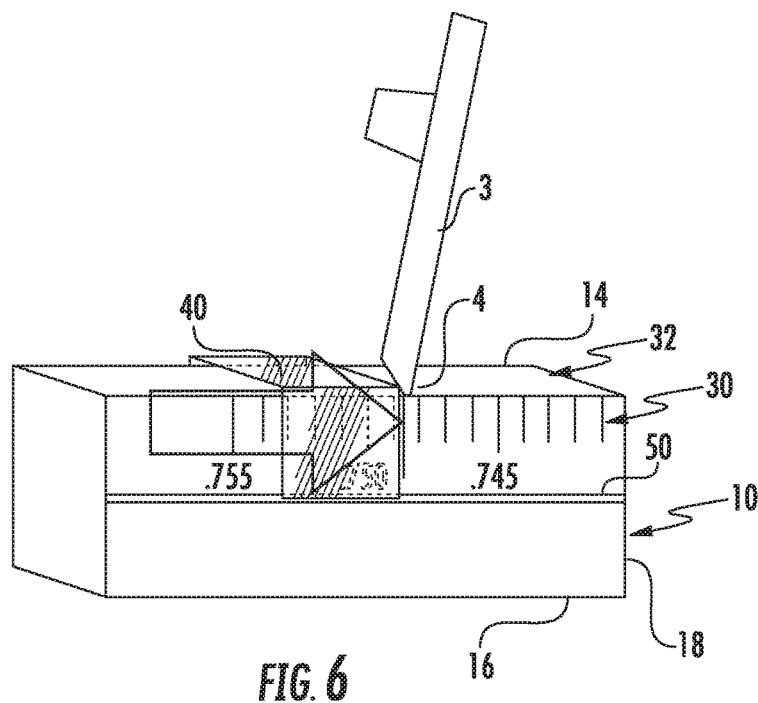
FIG. 6 is a view providing a side view of the measuring device shown in FIG. 4 with a slice lip lowered into position.
Figure 7:
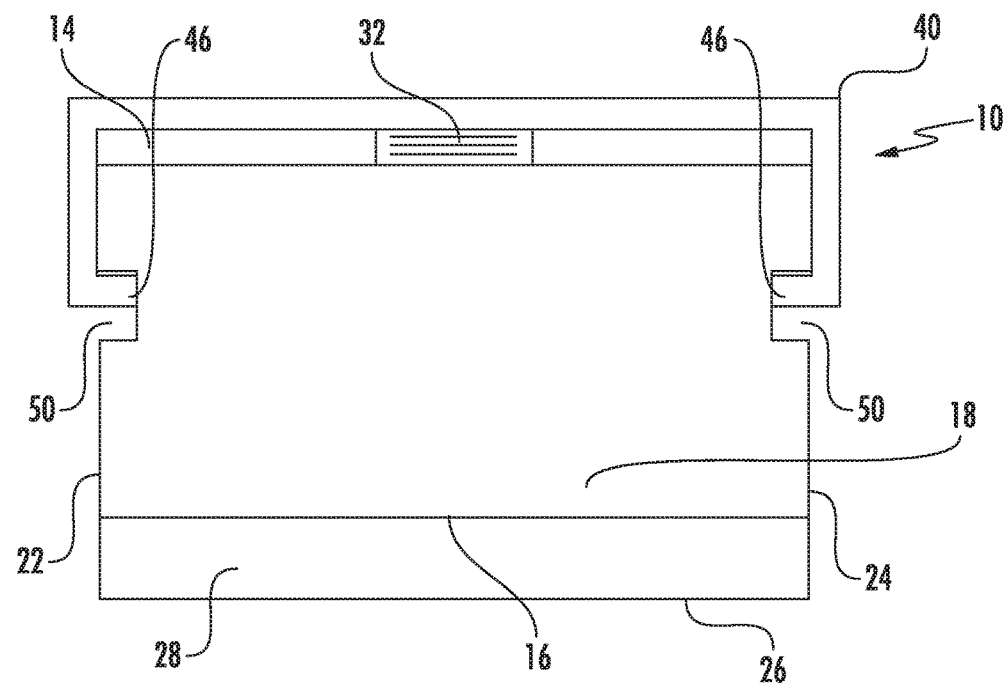
FIG. 7 is a view looking at the front end of the measuring device.
Figure 8A:
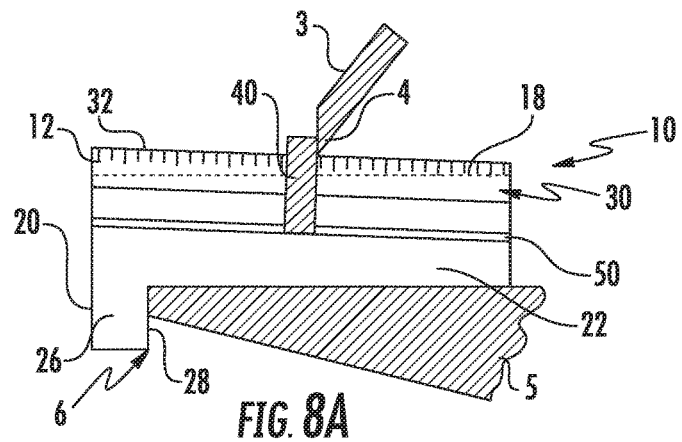
FIGS. 8A-8C are side, top and front views of the measuring device shown in FIGS. 4-7.
Figure 8B:
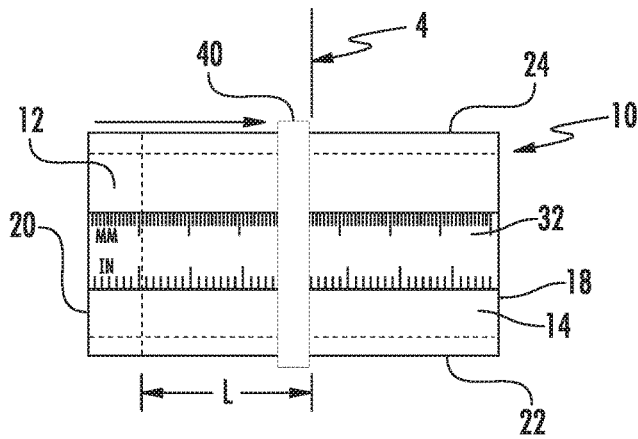
Figure 8C:
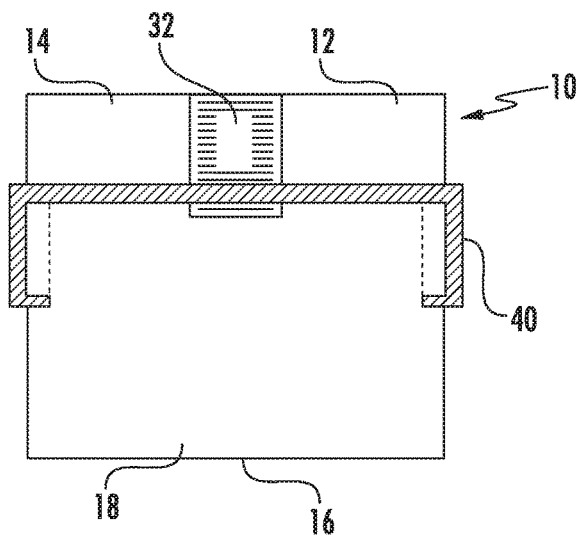

This is illustrated in one preferred embodiment as shown in FIGS. 4-6. However, the spacing of the gradations and the slope can be varied depending on the accuracy desired.

The setback measurement scale 32 used to obtain a value for setback L that is located on the top 14 can be a separate scale that is below the top surface so that it is parallel with the apron surface plane 5, or simply printed, etched or engraved in relief. The scale preferably provides precision ruled graduations in either or both English or metric (or other) distance units with a desired precision.

As shown in FIGS. 4-10, the sliding indicator 40 (similar to the slide of a slide rule) including a slice lip locator line 42 or similar indicator is movably attached to the device to allow for a direct visual reading of setback L from the first scale (see FIG. 4). The slice lip locator line 42 is positioned towards the front of the sliding indicator 40 facing the headbox when in use. The sliding indicator 40 is preferably generally U-shaped with inwardly directed tabs 46 at the ends of the U that engage and can move in grooves 50 located in the lateral sides 22, 24 of the block 12. The indicator 40 wraps three surfaces of the block 12 allowing for measurement readings from both top 14 for the setback distance measurement scale 32 and the lateral side(s) 22, 24 for the height measurement scale 30 based on the position of the locator line 42 relative to the chosen scale. Other measurement devices, such as a depth gauge, may be used in place of the sliding indicator.

The sliding indicator 40 may be transparent and structured and arranged so as to be capable of sliding by contact from front to back over the top 14 while guided by the two lateral side surfaces 22, 24 of the block 12; it is frictionally attached so as to allow movement with contact with the slice lip tip, but to resist any further movement once removed from the slice to allow the user to visually obtain the desired reading. The slice lip locator line 42 may extend across the width of the sliding indicator, or only a portion thereof; in any event, it must pass over both the setback and slice lip opening measurement scales 32, 30.

Figure 9:
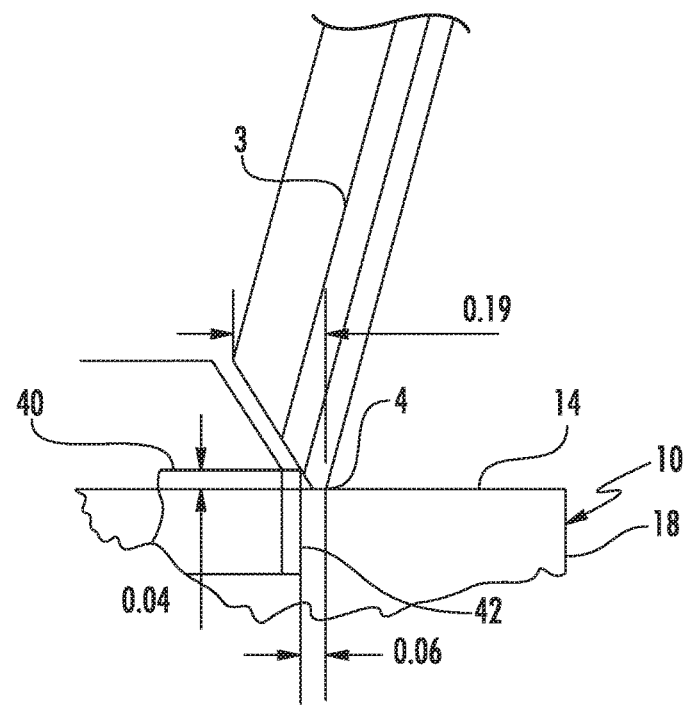
FIG. 9 is an illustration showing the sliding indicator of the measuring device in contact with a slice lip.

As shown in FIG. 9, the thickness of the sliding indicator 40, which is indicated in an exemplary manner as 0.04" in FIG. 9, may cause a slight offset at the contact point with the slice lip tip 4. The thickness of the sliding indicator and slice lip locator will therefore determine how far the locator line will be from the actual slice lip tip and is thus key to minimizing error in slice lip location. For example, if the thickness of the slice lip locator extends 0.040" above the upper surface of the measurement device, then the indicated value of the setback L as measured will be 0.060" less than the actual value (due to the thickness of the slice lip locator, see FIG. 9). This distance will change based on the angle of the slice lip 3, and adjustments may need to be accommodated in any measurement value L and the slice opening b. This may be partially taken into account in setting the zero position for the scales 30, 32 offset a certain distance based on a particular angle, or by noting the thickness as a required offset in the final determination of the setback and providing a guide with respect to the change in distance based on the approximate slice lip angle.

Alternatively, as shown in FIG. 10, the leading edge of the sliding indicator 40' can be tapered to a point. This would allow the zero position of the setback measurement scale to be set at the stop surface 28, and for the most part eliminate the need for an offset to the measurements read at the indicator line 42.

In use, the measurement scales 30, 32 and slice lip locator line 42 on the sliding indicator 40 cooperate so that a precise measurement of slice lip setback L and the slice opening b may be obtained. This is achieved as follows: With the slice lip 3 open, the front 18 of the measuring device 10 is inserted with the bottom 16 against the slice apron 5 such that the top 14 is inclined relative to the slice apron 5 so that the increasing thickness from front 18 to back 20 allows for measurement of the slice lip opening b. After insertion so that the stop surface 28 is in contact with the apron lip tip 6, the slice lip 3 is rotated and/or lowered to contact the top 14 of the measuring device 10, preferably at a "home position". The movable sliding indicator 40 is slid against the slice lip 3 at the slice lip tip 4. The measuring device 10 is then removed, and the actual slice opening dimension b is read by a position of indicator line 42 of the movable sliding indicator 40 against the height measurement scale 32 and an actual setback distance L is read by the position of the indicator line 42 of the movable sliding indicator 40 against the setback distance measurement scale.

In one preferred arrangement, the measuring device 10 comprises a block of UHMW polyethylene and is approximately 2" wide by about 3" in length and a set of the measuring devices are provided in thicknesses of about 0.5", 0.625", 0.75", 0.875", 1.0" and 1.125" so as to accommodate various headbox slice openings.

Referring to FIGS. 11A-11C and 12, a further embodiment of the measuring device 110 is shown. The measuring device 110 is similar to the measuring device 10, and similar elements have been designated with the same reference numbers plus 100. For the sliding indicator 40 of the measuring device 10 is functionally the same as the sliding indicator 140 provided for the measuring device 110. As shown in FIGS. 11A-11C and 12, the primary difference is that the block 112 includes an upper block part 112A and a lower block part 112B that are connected together and the top can move along an angled path relative to the bottom 116, for example by a dovetail projection 113 in the upper block part 112A engaging in a dovetail groove 115 in the lower block part 112B in order to adjust the nominal height for different sized slice openings b. A locking device, such as the locking screws 117 shown, is used to lock the two block parts 112A, 112B together prior to use at the desired nominal height setting. While screws 117 are shown, a clip or other fixed engagement between the two block parts 112A, 112B could be used. The lower block part 112B includes the stop 126, which can be in the form of an integral ledge, and depends from the bottom 116 surface at the back 120 of the block 112 and is adapted to be placed with a stop surface 128 thereof against the apron lip tip 6.

At least the top 114 is provided with a setback distance measurement scale 132 which is located on a top of the lower block 112B and extends from a zero position aligned in a fixed relation with the stop surface 128 toward a front 118 of the block 112 adapted for measuring the setback L. The setback distance measurement scale 132 is visible through the upper block part 112A, which is made of a transparent material.

Figure 12:
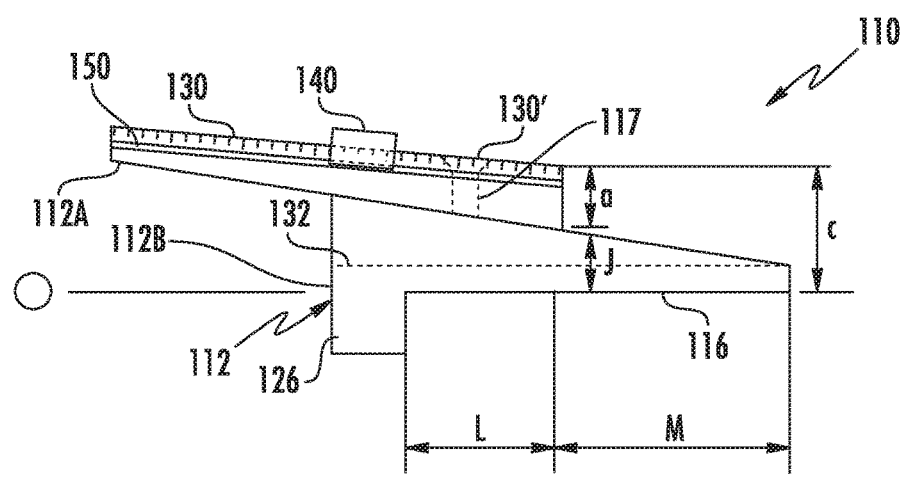
FIG. 12 is a side view of the measuring device of FIGS. 11A-11C illustrating a height adjustment of the measuring device to increase the vertical measurement range.

For having a greater height range, the upper block part 112A can be adjusted and locked in at least a second height position, for example, as shown in FIG. 12. First and second height scales 130, 130' can be located on the upper block part 112A that provide for the different height measurements using the sliding indicator 140 which can move in grooves 150 in the top block part 112A in the same manner as discussed above in connection with the first embodiment of the measuring device 10.

In one exemplary embodiment, the dimension α is 0.38 in., and the dimension d is 0.10 in. The dimension e is therefore 0.48 in. The dimension g is 0.40 in., and the dimension h is 0.10 in. The dimension f is therefore 0.5 in. This can be used in the configuration of the block 112 shown in FIG. 11A to check height measurements b of nominally in the range of 0.49 in. The configuration of the block 112 in FIG. 12 with the upper block part 112A set at a nominal distance M of 1.0 in. with j=0.25 would allow height measurements nominally in the range of c=0.63 in. and above. In this example, the nominal distance of the setback L is 0.7 in., and the thickness K of the stop is 0.3 in. These dimensions are exemplary and different dimensions could be used.

The invention claimed is:

1. A measuring device for simultaneously measuring both a slice lip opening and a setback of a headbox slice in a headbox of a papermaking machine, the headbox slice includes an upper lip having an upper lip tip, and a generally planar lower apron lip including an outer apron lip tip, the upper lip is setback a distance L from the apron lip tip, and provides a slice opening b which is a distance from upper lip tip to the surface of the lower apron, the measuring device comprising:
    a) a block having an opposing top and bottom, an opposing front and back, and two side surfaces, the top being set at an angle relative to the bottom to provide the block with a varying vertical thickness from the top to the bottom that tapers down in a direction from the back to the front;
    b) a stop depending from the bottom at the back of the block that is adapted to be placed with a stop surface thereof against the apron lip tip;
    c) a height measurement scale located on at least one of the two side surfaces and extending in a direction from the front to the back adapted for measuring the slice opening b;
    d) a setback distance measurement scale located at the top extending from a zero position aligned in a fixed relation with the stop surface toward a front of the block adapted for measuring the setback L; and
    e) a movable sliding indicator connected to the block that slides in a direction from front to back, the movable sliding indicator includes a slice lip locator adapted to move into sliding contact with the slice lip to indicate the setback distance L on the setback distance measuring scale while simultaneously indicating the slice opening b on the height measurement scale.

2. The device according to claim 1 wherein the measurement scales are each selected from a graduated scale strip located directly on or affixed to the block or an encoded strip located directly on or affixed to the block that is encoded magnetically or via physical markings and read optically or magnetically by a reader on the sliding indicator.

3. The device according to 1 wherein the stop is a ledge integrally constructed with the block.

4. The device according to 3 further comprising a series of spacer blocks that are attachable to the bottom.

5. The device according to 1 wherein the block has a generally rectangular cross-sectional configuration and an inclination of the top surface is caused by placing at least one wedge against the bottom.

6. The device according to 1 wherein the top surface of the block is inclined relative to the bottom surface at a known angle.

7. The device according to 1 wherein the movable sliding indicator is restrained from movement following insertion and removal of the device from the slice opening.

8. The device according to 1 wherein the block is constructed of UHMW polyethylene and the movable sliding indicator is a transparent plastic including a slice lip locator line whose position provides for reading the measurement of the setback L and the slice opening b from each of the setback distance measurement scale and the height measurement scale.

9. The device according to 1 wherein the movable sliding indicator includes a tapered contact edge.

10. The device according to 9 wherein the setback distance measurement scale is aligned with the zero position corresponding with the stop surface.

11. The device according to 1 wherein the movable sliding indicator is U-shaped and has inwardly directed tabs at the ends of the U-shape, and grooves are located in the lateral sides of the block that extend in a direction from the front to the back, parallel to the top, and the tabs are engaged in the grooves.

12. The device according to 1 wherein the setback distance measurement scale is below the top of the block and parallel to the apron surface.

13. The device according to claim 1 wherein the block comprises an upper block part and a lower block part that are connected together along an angled path relative to the bottom and are movable to adjust a nominal height of the block.

14. The device according to claim 13 further comprising a locking device to hold upper block part and the lower block part together in a fixed position.

15. A method for simultaneously measuring both a slice lip opening and a setback of a headbox slice in a headbox of a papermaking machine, the headbox slice includes an upper lip having an upper lip tip, and a generally planar lower apron lip including an outer apron lip tip, the upper lip is setback a distance L from the apron lip tip, and provides a slice opening b which is a distance from upper lip tip to the surface of the lower apron, the method comprising:

providing a measuring device which includes (a) a block having an opposing top and bottom, an opposing front and back, and two side surfaces, the top being set at an angle relative to the bottom to provide the block with a varying vertical thickness from the top to the bottom that tapers down in a direction from the back to the front, (b) a stop depending from the bottom surface at the back of the block that is adapted to be placed with a stop surface thereof against the apron lip tip, (c) a height measurement scale located on at least one of the two side surfaces and extending in a direction from the front to the back adapted for measuring the slice opening b, (d) a setback distance measurement scale at the top of the block extending from a zero position aligned in a fixed relation with the stop surface toward a front of the block adapted for measuring the setback L, and (e) a movable sliding indicator connected to the block that slides in a direction from front to back, the movable sliding indicator includes a slice lip locator adapted to move into sliding contact with the slice lip to indicate the setback distance L on the setback distance measuring scale while simultaneously indicating the slice opening b on the height measurement scale;

inserting the front of the measuring device with the bottom against the slice apron such that the top is inclined relative to the slice apron so that the increasing thickness from front to back to allows for measurement of the slice lip opening b;

after insertion so that the stop surface is in contact with the apron lip, lowering the slice lip to contact the top of the measuring device;

sliding the movable sliding indicator is against the slice lip;

removing the measuring device; and reading an actual slice opening dimension b by a position of the movable sliding indicator against the height measurement scale and reading an actual setback distance L by the position of the movable sliding indicator against the setback distance measurement scale.

* * * * *